(12) United States Patent
Hayashi et al.

(10) Patent No.: US 7,093,963 B2
(45) Date of Patent: Aug. 22, 2006

(54) LIGHT AXIS ADJUSTING APPARATUS FOR VEHICLE HEADLAMP

(75) Inventors: Kenji Hayashi, Tokyo (JP); Masayuki Kayano, Tokyo (JP)

(73) Assignee: Mitsubishi Fuso Truck and Bus Corporation, (JP)

( * ) Notice: Subject to any disclaimer, the term of this patent is extended or adjusted under 35 U.S.C. 154(b) by 167 days.

(21) Appl. No.: 10/803,795

(22) Filed: Mar. 18, 2004

(65) Prior Publication Data

US 2004/0246731 A1    Dec. 9, 2004

(30) Foreign Application Priority Data

Mar. 18, 2003   (JP)  .............................. 2003-073138

(51) Int. Cl.
*B60Q 1/10*   (2006.01)
*F21V 1/00*   (2006.01)

(52) U.S. Cl. .................... 362/466; 362/485; 315/77

(58) Field of Classification Search ............... 362/460, 362/464–467, 523, 525, 485; 315/82, 77; 73/627–628; 340/306, 440; 702/104
See application file for complete search history.

(56) References Cited

U.S. PATENT DOCUMENTS

| | | | | |
|---|---|---|---|---|
| 4,630,226 | A * | 12/1986 | Tanaka | 702/103 |
| 4,722,547 | A * | 2/1988 | Kishi et al. | 367/96 |
| 5,877,680 | A | 3/1999 | Okuchi et al. | |
| 6,130,506 | A | 10/2000 | Lopez et al. | |
| 6,480,806 | B1 * | 11/2002 | Bilz et al. | 702/154 |
| 6,618,323 | B1 * | 9/2003 | Kayano et al. | 367/96 |
| 6,693,380 | B1 | 2/2004 | Toda et al. | |
| 6,870,319 | B1 * | 3/2005 | Kayano et al. | 315/82 |
| 2003/0138132 | A1 | 7/2003 | Stam et al. | |

FOREIGN PATENT DOCUMENTS

| | | |
|---|---|---|
| DE | 42 02 908 A1 | 8/1993 |
| DE | 43 11 669 A1 | 10/1994 |
| DE | 197 04 466 A1 | 2/1997 |
| DE | 199 39 949 A1 | 8/1999 |
| DE | 198 43 388 A1 | 3/2000 |
| DE | 199 44 289 A1 | 4/2000 |
| DE | 100 02 602 A1 | 10/2000 |
| JP | 09-002148 A | 1/1997 |

(Continued)

OTHER PUBLICATIONS

U.S. Appl. No. 10/803,536, filed Mar. 2004, Kenji Hayashi et al.

(Continued)

*Primary Examiner*—Alan Cariaso
*Assistant Examiner*—Jason Han
(74) *Attorney, Agent, or Firm*—Rossi, Kimms & McDowell LLP.

(57) ABSTRACT

A light axis adjusting apparatus for a vehicle headlamp has an inclination sensor which receives at least two ultrasonic signals transmitted toward a road surface in a vehicle width direction, and detects the inclined state of a vehicle relative to the road surface based on a receiving time difference between the respective ultrasonic signals. Processings are performed such that the inclination angle $\Delta\alpha$ of the vehicle is detected based on the results of detection of the inclination sensor; an actuator is driven based on the inclination angle $\Delta\alpha$ to correct the inclination angle of the headlamp; and the abnormality of the inclination sensor is detected based on the state of reception of the ultrasonic signals. Thus, the inclined state of the vehicle is detected constantly with high accuracy, and the light axis of the headlamp can be adjusted appropriately.

8 Claims, 15 Drawing Sheets

FOREIGN PATENT DOCUMENTS

| | | |
|---|---|---|
| JP | 09-207653 | 8/1997 |
| JP | 09-207654 | 8/1997 |
| JP | 09-315213 | 12/1997 |
| JP | 10-059061 | 3/1998 |
| JP | 10-166933 | 6/1998 |
| JP | 10-250462 | 9/1998 |
| JP | 10-250463 | 9/1998 |
| JP | 2000-103280 | 4/2000 |
| JP | 2000318514 A * | 11/2000 |
| JP | 2003025905 A * | 1/2003 |

OTHER PUBLICATIONS

Office Action for corresponding German application, dated Feb. 11, 2005, and its English translation.

* cited by examiner

F I G. 14
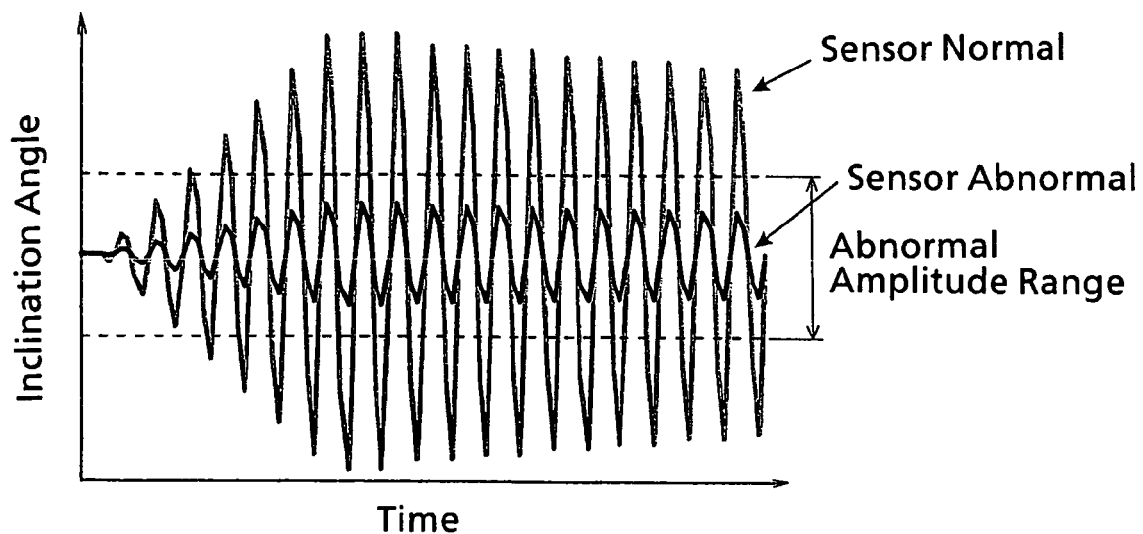
F I G. 15
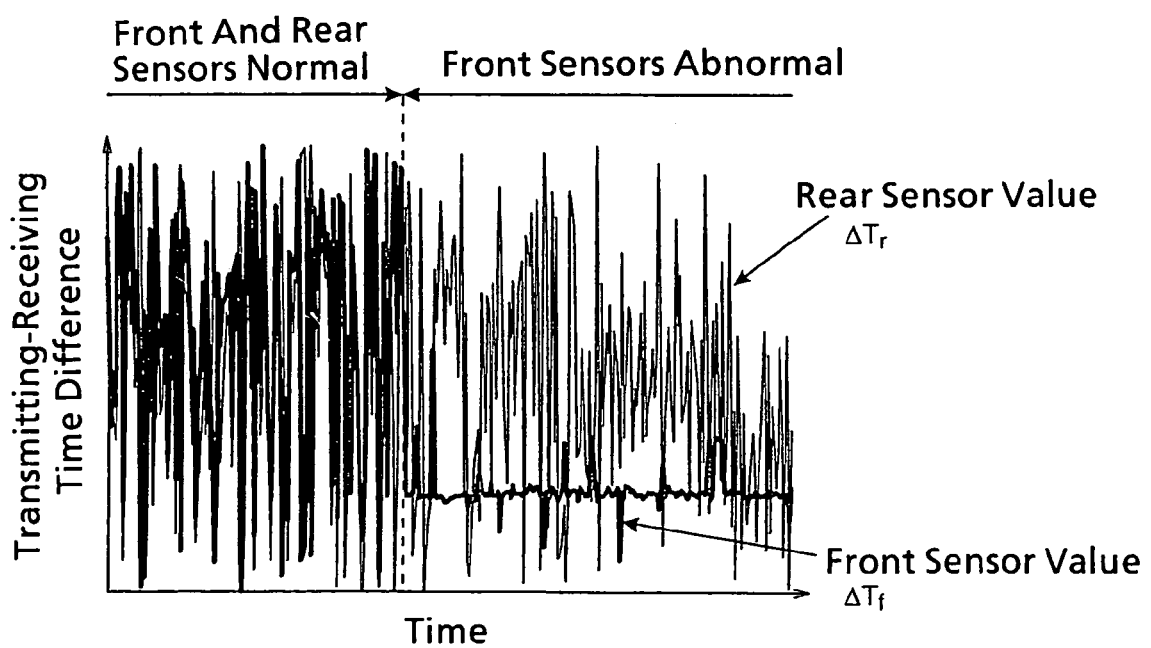

LIGHT AXIS ADJUSTING APPARATUS FOR VEHICLE HEADLAMP

The entire disclosure of Japanese Patent Application No. 2003-73138 filed on Mar. 18, 2003, including specification, claims, drawings and summary, is incorporated herein by reference in its entirety.

BACKGROUND OF THE INVENTION

1. Field of the Invention

This invention relates to a light axis adjusting apparatus for adjusting the light axis of a headlamp according to the inclined state of a vehicle. This invention is preferred, particularly when applied to a truck having a cab and a cargo bed provided on a frame.

2. Description of the Related Art

In recent years, high intensity lamps have been adopted from the viewpoint of safety. High intensity lamps contribute greatly to safety, but are highly likely to be dazzling to other vehicles. Thus, studies have been conducted on various technologies for adjusting the light axis of a headlamp according to the inclined status of a vehicle so as not to dazzle the driver of an oncoming vehicle.

Japanese Patent Application Laid-Open No. 1998-166933, hereinafter referred to as Patent Document 1, proposes such a light axis adjusting apparatus for adjusting the light axis of a headlamp according to the inclined status of a vehicle.

"A vehicle headlamp light axis direction automatic adjusting apparatus" described in Patent Document 1 calculates a pitch angle in a longitudinal direction of a vehicle based on signals from height sensors disposed on front and rear wheels of the vehicle; and performs filtering of the pitch angle in a driving state control mode set based on a vehicle speed and acceleration to change the response of adjustment of the light axis direction of headlamps so as not to dazzle an oncoming vehicle.

In the above apparatus of Patent Document 1, a pair of height sensors (front and rear ones) for measuring the amounts of change in the front and rear vehicle heights are used to detect the inclination of the vehicle. When this conventional apparatus is applied to a truck or the like having a cab and a cargo bed provided on a frame, the amounts of displacement between the front or rear axle and the frame are detected, and the inclined status of the cab is determined by the difference between the front and rear displacement amounts. Based on this determination, the light axis of the headlamp is adjusted.

In the truck having the cargo bed provided on the frame, however, the frame is deflected under a load of a cargo, thus making it difficult to determine the inclined status accurately. That is, depending on the position of the cargo, the vertical strokes between the front and rear axles and the frame may be nearly the same, although the frame is deflected and a front end portion of the frame (a portion on the cab side) is inclined upwards. In this case, the light axis of the headlamp needs to be adjusted so as to be directed downward. However, it may be determined that there is no inclined state, and this may make it impossible to adjust the light axis of the headlamp.

Various light axis adjusting apparatuses have also been proposed in which ultrasonic sensors are mounted at the front and rear of the vehicle instead of the height sensors, and the inclination of the vehicle is determined based on the difference in output between these front and rear ultrasonic sensors. However, the ultrasonic sensor is mounted, while exposed to the outside, at a lower portion of the vehicle. Thus, a stain such as dust or mud is liable to deposit on a signal transmitting portion or a signal receiving portion of the ultrasonic sensor. This stain may make high accuracy detection of the vehicle height impossible.

SUMMARY OF THE INVENTION

The present invention has been accomplished in the light of the above-mentioned circumstances. It is the object of the invention to provide a light axis adjusting apparatus for a headlamp, which can constantly detect the inclined state of a vehicle with high accuracy and adjust the light axis of the headlamp appropriately.

A light axis adjusting apparatus for a vehicle headlamp, as a first aspect of the present invention for attaining the above object, comprises: a light axis adjustor for adjusting the light axis of the headlamp of a vehicle; an operating state detector for detecting the operating state of the vehicle; an inclined state detector including at least one ultrasonic wave transmitter and at least two receivers for receiving an ultrasonic signal from the transmitter, the inclined state detector being adapted to detect the inclined state of the vehicle relative to a road surface based on a receiving time difference between the respective receivers; an abnormality detector for detecting the abnormality of the inclined state detector based on the received state of the ultrasonic signal; and a control device for controlling the light axis adjustor based on the results of detection of the inclined state detector and the abnormality detector.

According to this aspect, the inclined state of the vehicle is detected based on the receiving time difference between at least two ultrasonic signals received, and the abnormality of the inclined state detector is detected based on the received state of the ultrasonic signals. The control device can reliably detect the abnormality of the inclined state detector and deal with the abnormality, and can also detect the inclined state of the vehicle with high accuracy and appropriately adjust the light axis of the headlamp.

According to the light axis adjusting apparatus for a vehicle headlamp, as a second aspect of the invention, the abnormality detector may determine the abnormality of the inclined state detector when the intensity of the ultrasonic signal received is not higher than a predetermined specified value which has been preset.

According to this aspect, if the ultrasonic signals cannot be normally received for any cause, the intensity of the ultrasonic signal falls. By using this fall as a factor for abnormality determination, the abnormality of the inclined state detector can be detected reliably.

According to the light axis adjusting apparatus for a vehicle headlamp, as a third aspect of the invention, the inclined state detector may be composed of two ultrasonic sensors, each of the ultrasonic sensors consisting of a transmitter and a receiver, and the abnormality detector may determine the abnormality of the inclined state detector when a deviation between a transmitting-receiving time difference of the ultrasonic signal in one of the ultrasonic sensors and a transmitting-receiving time difference of the ultrasonic signal in the other ultrasonic sensor is not smaller than a predetermined specified value which has been preset.

According to this aspect, if the ultrasonic signals cannot be normally received for any cause, the deviation between the transmitting-receiving time differences of the respective ultrasonic signals is relatively great. By using this phenomenon as a factor for abnormality determination, the abnormality of the inclined state detector can be detected reliably.

According to the light axis adjusting apparatus for a vehicle headlamp, as a fourth aspect of the invention, the abnormality detector may determine the abnormality of the inclined state detector when the amount of change or the rate of change of the inclined state of the vehicle is not smaller than a predetermined specified value which has been preset.

According to this aspect, if one of the ultrasonic signals cannot be normally received for any cause, the amount of change or the rate of change of the inclined state found from the receiving time difference is relatively large. By using this phenomenon as a factor for abnormality determination, the abnormality of the inclined state detector can be detected reliably.

According to the light axis adjusting apparatus for a vehicle headlamp, as a fifth aspect of the invention, a display device for indicating the abnormality of the inclined state detector may be provided within a vehicle compartment of the vehicle, and the control device may actuate the display device when the abnormality detector determines the abnormality of the inclined state detector.

According to this aspect, if an abnormality occurs in the inclined state detector, the display device is actuated to inform the occupant of the abnormality of the inclined state detector, thereby enabling action to be taken against the abnormality at an early stage.

According to the light axis adjusting apparatus for a vehicle headlamp, as a sixth aspect of the invention, a cleaning device may be provided for cleaning a signal receiving portion of the inclined state detector, and the control device may actuate the cleaning device when the abnormality detector determines the abnormality of the inclined state detector.

When an abnormality occurs in the inclined state detector, the signal receiving portion is often stained. By actuating the cleaning device to remove the stain on the signal receiving portion, the abnormality can be resolved reliably.

According to the light axis adjusting apparatus for a vehicle headlamp, as a seventh aspect of the invention, the vehicle may be a truck furnished with a cab and a frame where the cab is disposed, and the inclined state detector may be placed on the cab or a vehicle front portion of the frame.

A light axis adjusting apparatus for a vehicle headlamp, as an eighth aspect of the invention, comprises: a light axis adjustor for adjusting the light axis of the headlamp of a vehicle; an operating state detector for detecting the operating state of the vehicle; an inclined state detector including two ultrasonic wave transmitters and two receivers for receiving ultrasonic signals from the transmitters, the inclined state detector being adapted to detect the inclined state of the vehicle relative to a road surface based on a receiving time difference between the respective receivers; a control device for controlling the light axis adjustor based on the results of detection of the inclined state detector and the abnormality detector; an abnormality detector for detecting an abnormality of the inclined state detector based on the received state of the ultrasonic signals; a display device, placed within a vehicle compartment of the vehicle, for indicating the abnormality of the inclined state detector; and a control device for controlling the light axis adjustor based on the results of detection of the inclined state detector and the abnormality detector, and also for actuating the display device when the abnormality detector determines the abnormality of the inclined state detector.

According to the light axis adjusting apparatus for a vehicle headlamp, as a ninth aspect of the invention, the abnormality detector may determine the abnormality of the inclined state detector when the intensity of the ultrasonic signal received is not higher than a predetermined specified value which has been preset.

According to the light axis adjusting apparatus for a vehicle headlamp, as a tenth aspect of the invention, the abnormality detector may determine the abnormality of the inclined state detector when a deviation between a transmitting-receiving time difference of the ultrasonic signal in one combination of the transmitter and the receiver and a transmitting-receiving time difference of the ultrasonic signal in the other combination of the transmitter and the receiver is not smaller than a predetermined specified value which has been preset.

According to the light axis adjusting apparatus for a vehicle headlamp, as an eleventh aspect of the invention, the abnormality detector may determine the abnormality of the inclined state detector when the amount of change or the rate of change of the inclined state of the vehicle is not smaller than a predetermined specified value which has been preset.

According to the light axis adjusting apparatus for a vehicle headlamp, as a twelfth aspect of the invention, the vehicle may be a truck furnished with a cab and a frame where the cab is disposed, and the inclined state detector may be placed on the cab or a vehicle front portion of the frame.

A light axis adjusting apparatus for a vehicle headlamp, as a thirteenth aspect of the invention, comprises: light axis adjusting means for adjusting the light axis of the headlamp of a vehicle; operating state detecting means for detecting the operating state of the vehicle; inclined state detecting means including at least one ultrasonic wave transmitter and at least two receivers for receiving an ultrasonic signal from the transmitter, the inclined state detecting means being adapted to detect the inclined state of the vehicle relative to a road surface based on a receiving time difference between the respective receivers; abnormality detecting means for detecting an abnormality of the inclined state detecting means based on the received state of the ultrasonic signal; and control means for controlling the light axis adjusting means based on the results of detection of the inclined state detecting means and the abnormality detecting means.

A light axis adjusting apparatus for a vehicle headlamp, as a fourteenth aspect of the invention, comprises: light axis adjusting means for adjusting the light axis of the headlamp of a vehicle; operating state detecting means for detecting the operating state of the vehicle; inclined state detecting means including two ultrasonic wave transmitters and two receivers for receiving ultrasonic signals from the transmitters, the inclined state detecting means being adapted to detect the inclined state of the vehicle relative to a road surface based on a receiving time difference between the respective receivers; control means for controlling the light axis adjusting means based on the results of detection of the inclined state detecting means and the abnormality detecting means; abnormality detecting means for detecting an abnormality of the inclined state detecting means based on the received state of the ultrasonic signals; display means, placed within a vehicle compartment of the vehicle, for indicating the abnormality of the inclined state detecting means; and control means for controlling the light axis adjusting means based on the results of detection of the inclined state detecting means and the abnormality detecting means, and also for actuating the display means when the abnormality detecting means determines the abnormality of the inclined state detecting means.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 14 is a graph showing the received waveforms of the ultrasonic sensor for determination of an abnormality of an inclination sensor;

FIG. 15 is a graph showing a deviation between transmitting-receiving time differences of the respective ultrasonic sensors, designed to determine an abnormality of the inclination sensor;

DETAILED DESCRIPTION OF THE PREFERRED EMBODIMENTS

The preferred embodiments of the present invention will now be described in detail with reference to the accompanying drawings.

Figure 1:
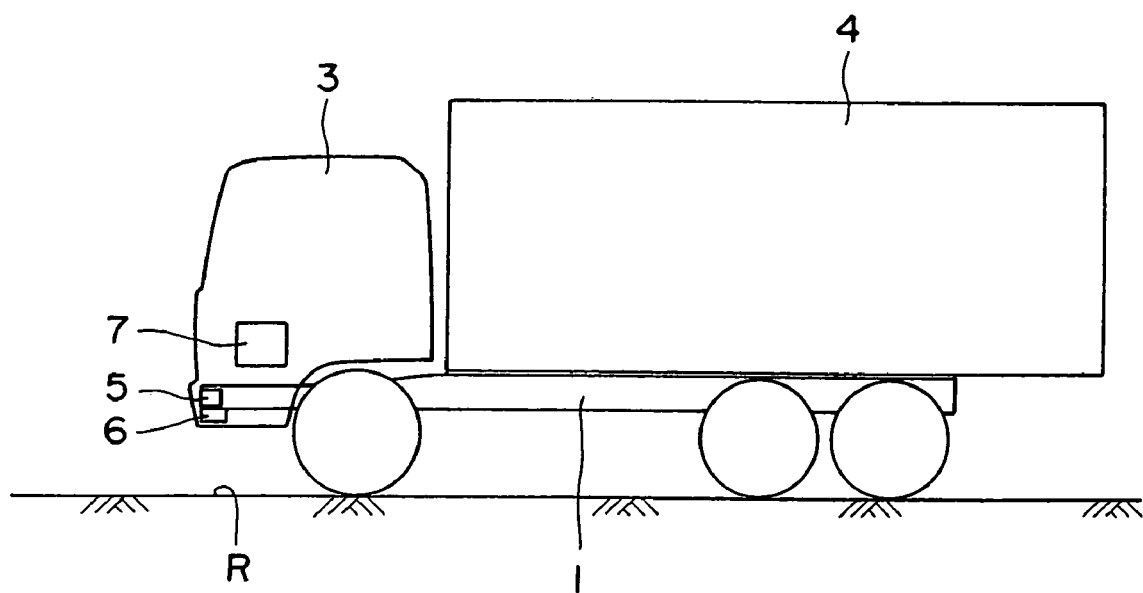
FIG. 1 is a schematic configuration drawing of a truck equipped with a light axis adjusting apparatus for a vehicle headlamp according to an embodiment of the present invention.
Figure 2:
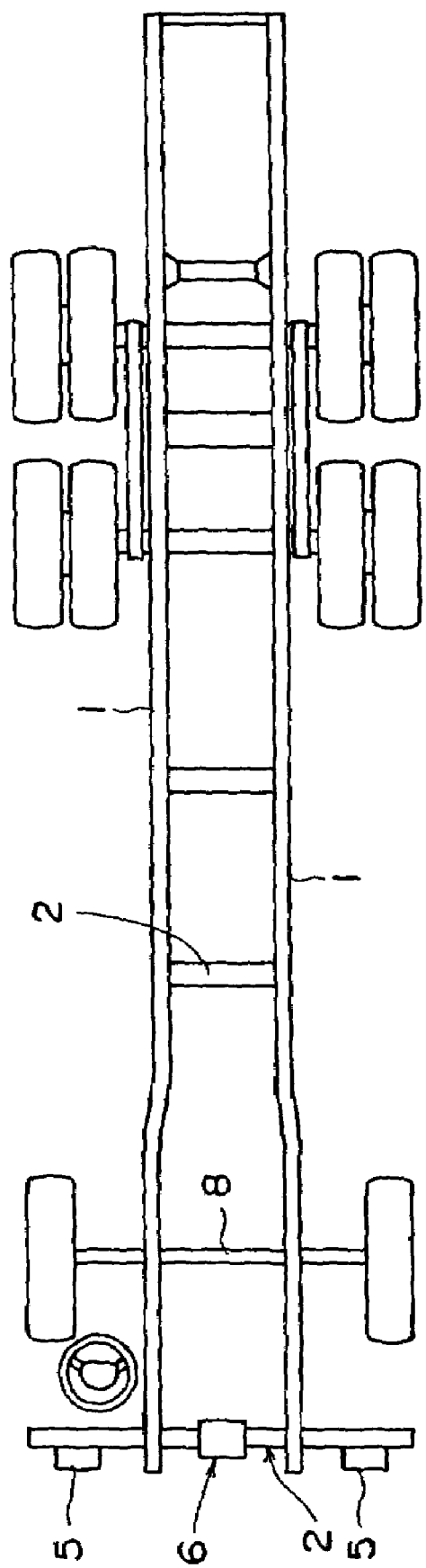
FIG. 2 is a plan view of a frame of the truck.
Figure 3:
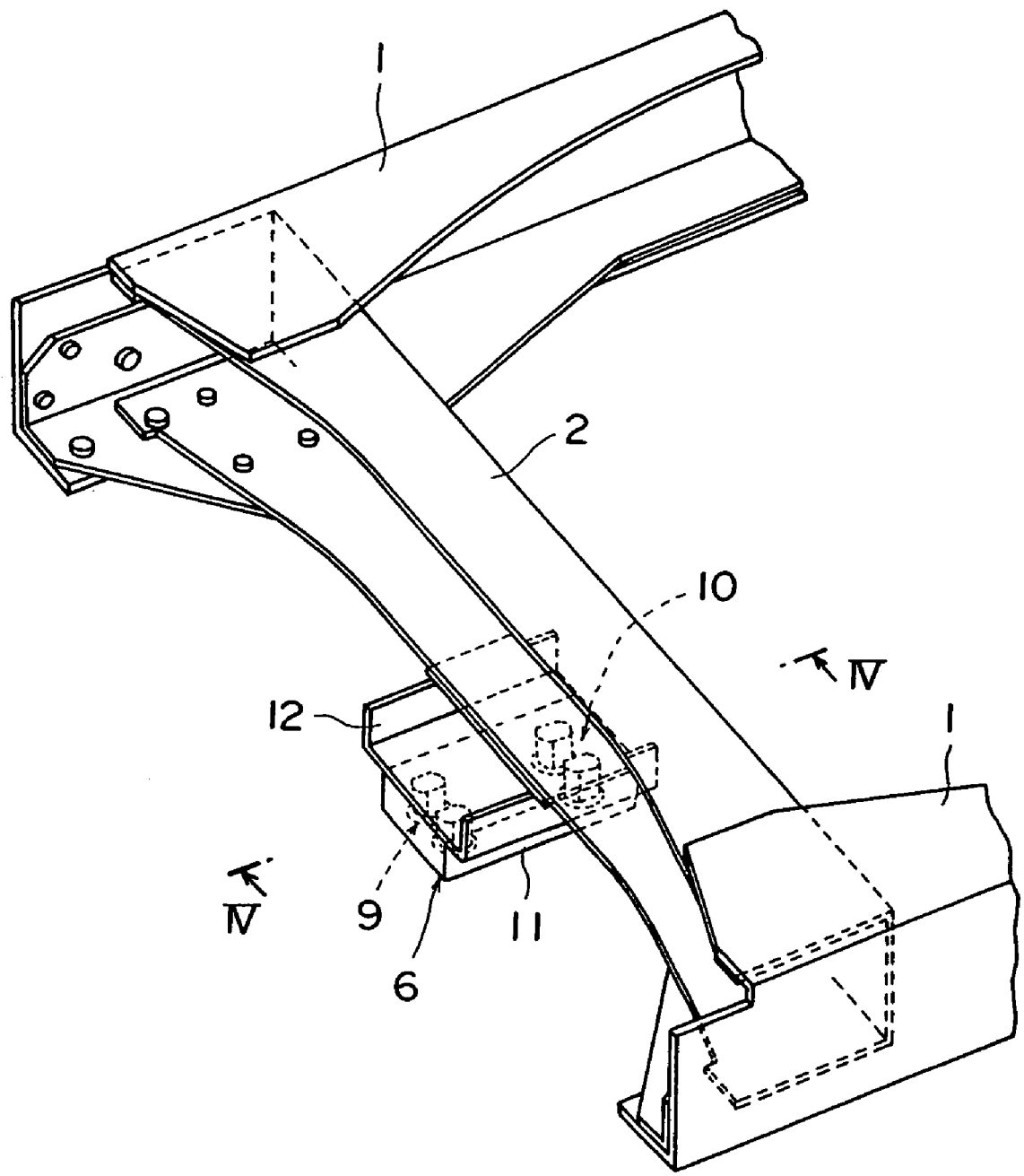
FIG. 3 is a schematic view of a front portion of the frame showing the state of mounting of ultrasonic sensors.
Figure 4:
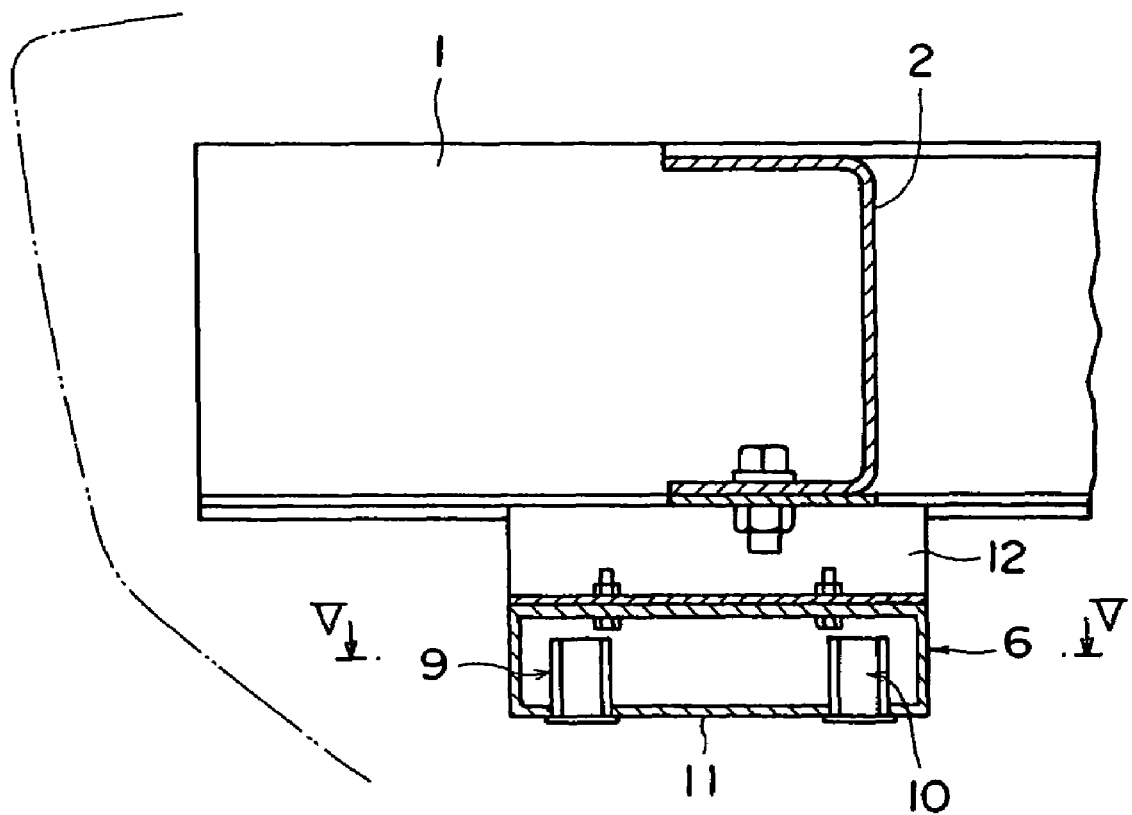
FIG. 4 is a sectional view taken on line IV—IV of FIG. 3.
Figure 5:
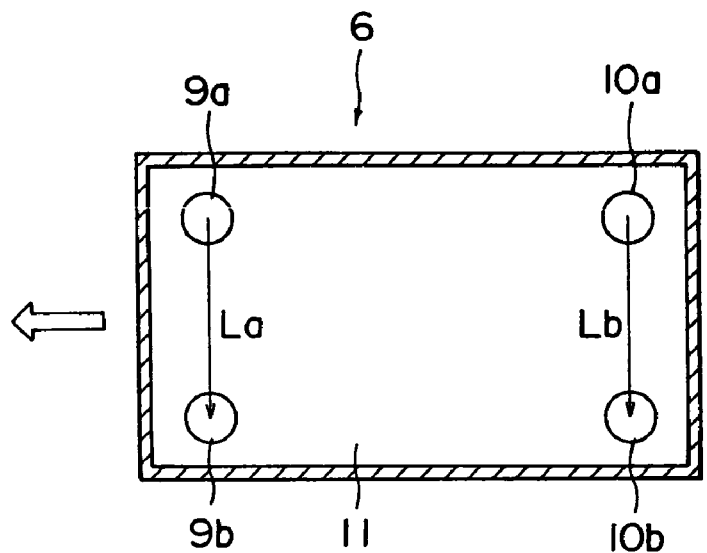
FIG. 5 is a sectional view taken on line V—V of FIG. 4.

In a light axis adjusting apparatus for a vehicle headlamp according to an embodiment of the invention, a plurality of cross members 2 are assembled to, while being perpendicular to, a pair of (i.e. right and left) side frames 1, and a cab 3 and a cargo bed 4 are loaded on a frame composed of the side frames 1 and the cross members 2, as shown in FIGS. 1 and 2. Right and left headlamps 5 are mounted on both sides of the cross member 2 in a front end portion of a vehicle, and an inclination sensor 6, as an inclination detector, is disposed in a nearly central portion of this cross member 2. Detection signals from the inclination sensor 6 are entered into an ECU 7 as a control device, and the ECU 7 determines an inclined state of a front portion of the vehicle relative to a road surface based on detection information from the inclination sensor 6.

The right and left headlamps 5 may be provided on the cab 3. The inclination sensor 6 may be provided on an upper side rail of the front axle 8, or if provided forwardly of the front axle 8, may be provided in an end portion of the vehicle other than the cross member 2 (for example, on the cab 3).

The inclination sensor 6 will be describe in detail. As shown in FIGS. 3 to 6, the inclination sensor 6 comprises two ultrasonic sensors 9 and 10 for transmitting and receiving signals in a vehicle width direction, and has two transmitters 9a and 10a as a signal transmitting portion, and two receivers 9b and 10b as a signal receiving portion. The transmitters 9a, 10a are disposed on the right side of the vehicle, while the receivers 9b, 10b are disposed on the left side of the vehicle. The directions of transmitted and received waves of the respective ultrasonic sensors 9 and 10 are nearly parallel to each other, and are nearly perpendicular to the longitudinal direction of the vehicle. The positions of mounting of the transmitters 9a, 10a and the receivers 9b, 10b may be laterally reversed.

The ultrasonic sensors 9, 10 are housed in a box-shaped case 11 such that transmitting and receiving surfaces in their lower portions are exposed. The case 11 is mounted to an intermediate portion of the cross member 2 via a U-shaped bracket 12, so that the inclination sensor 6 is mounted on a front portion of the vehicle in opposed relationship with the road surface R. Because of this arrangement, a mounting space for the inclination sensor 6 can be shortened in the longitudinal direction of the vehicle. By housing the ultrasonic sensors 9, 10 in the case 11, moreover, the inclination sensor 6 can be made compact, and can be easily mounted on the cross member 2.

Two of the ultrasonic sensors, 9 and 10, are provided anteriorly and posteriorly such that the transmitters 9a, 10a and the receivers 9b, 10b are separate members. However, this feature is not restrictive, and three of the ultrasonic sensors may be provided. Also, the transmitter and the receiver may be integrally assembled, and two of the transmitter-receiver assemblies may be provided forward and rearward. Alternatively, two receivers may be provided for one transmitter so as to be zigzag in the vehicle width direction or in the longitudinal direction of the vehicle. If there is an ample space for mounting, the transmitters and the receivers can be disposed in a row along the longitudinal direction of the vehicle. Furthermore, a laser sensor may be applied as the inclination sensor 6 instead of the ultrasonic sensor.

The inclination sensor 6 detects, for determination, the inclined state of the vehicle relative to the road surface R based on the difference in the receiving time between the two ultrasonic sensors 9 and 10. Ultrasonic waves from the transmitters 9a, 10a are reflected by the road surface R and received by the receivers 9b, 10b. Based on the difference between the receiving times of the receivers 9b and 10b, the inclined state of the vehicle relative to the road surface R is detected and determined. That is, signals from the transmitters 9a, 10a and signals of the receivers 9b, 10b are entered into the ECU 7, and the inclined state of the front cross member 2 (the inclined state of the front of the vehicle) relative to the road surface is determined by the ECU 7 based on the difference between the times when the receivers 9b, 10b receive ultrasonic waves. The inclination sensor 6 is designed to detect, for determination, the inclined state of the vehicle relative to the road surface R based on the difference in the receiving time. However, the inclined state of the vehicle relative to the road surface R may be detected and determined based on the difference in received phase.

The method of detecting, for determination, the inclined state of the vehicle by the inclination sensor 6 will be described in detail with reference to FIGS. 6 to 8.

Figure 8:
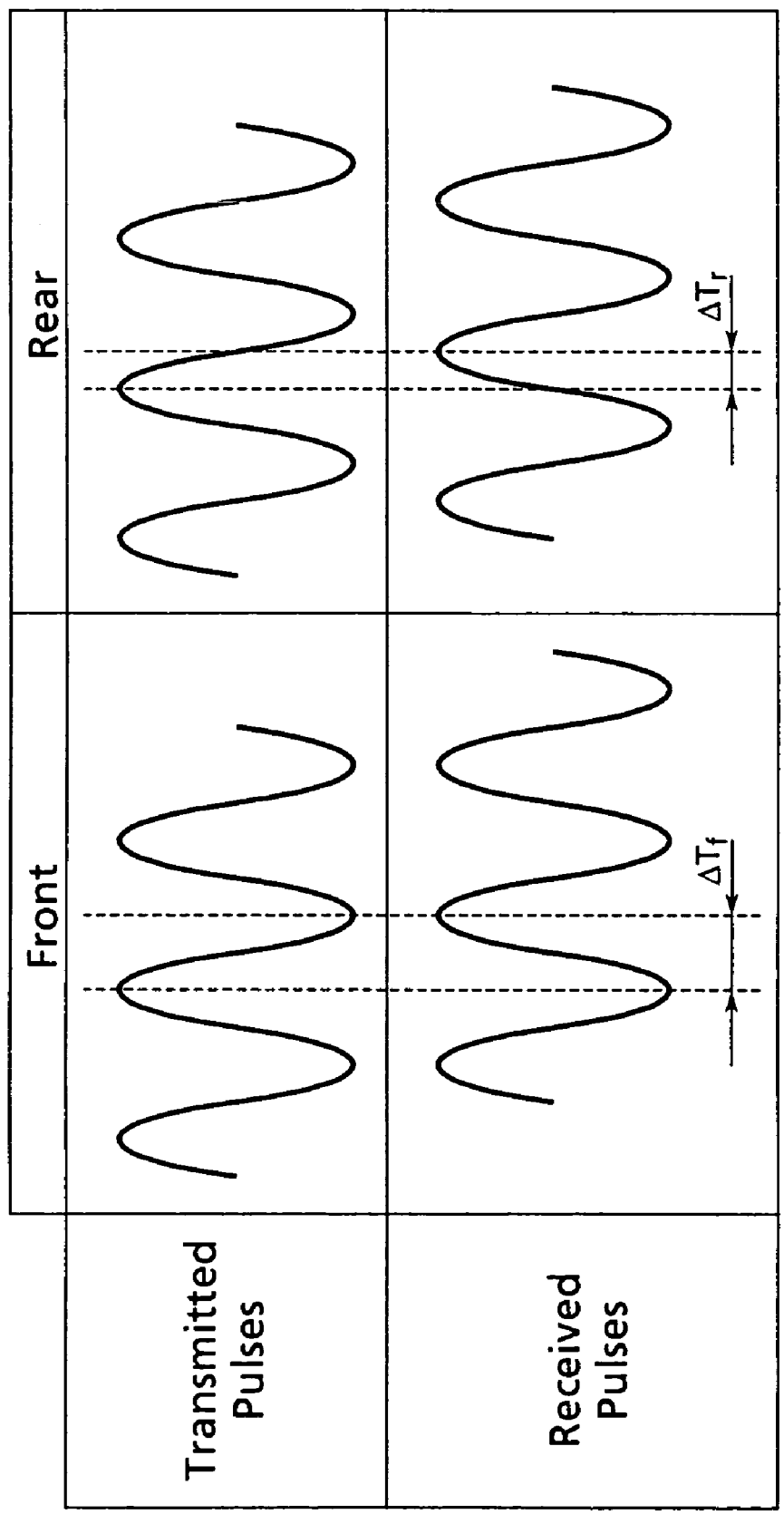
FIG. 8 is a graph showing transmitted waveforms and received waveforms of the ultrasonic sensors.

As shown in FIG. 8, the front and rear transmitters 9a and 10a in the ultrasonic sensors 9, 10 transmit wave-shaped ultrasonic waveforms, while the front and rear receivers 9b and 10b receive the wave-shaped ultrasonic waveforms, which have been transmitted by the transmitters 9a and 10a, with predetermined delays. Thus, transmitting-receiving time differences ΔTf and ΔTr occur, and a receiving time difference ΔT is calculated based on the transmitting-receiving time differences ΔTf and ΔTr. From the result of calculation, an inclination angle Δα of the vehicle is found.

Figure 6:
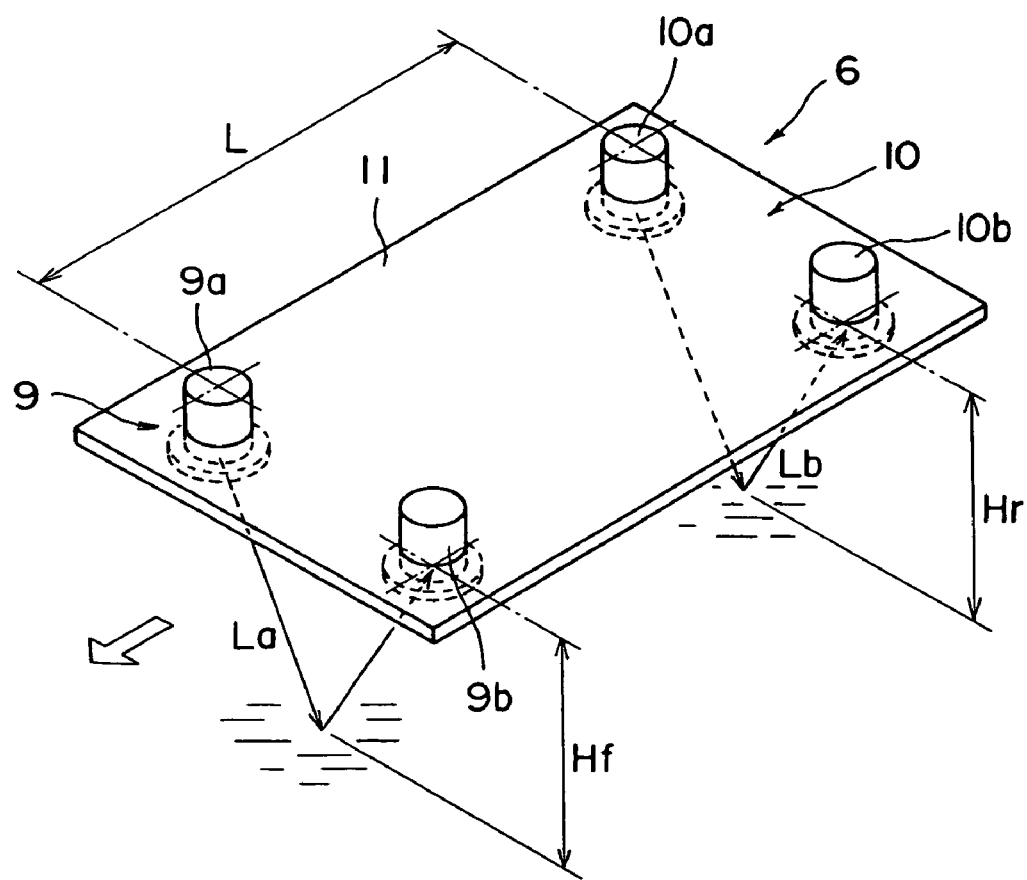
FIG. 6 is a schematic view showing the state of mounting of the ultrasonic sensors.
Figure 7A:
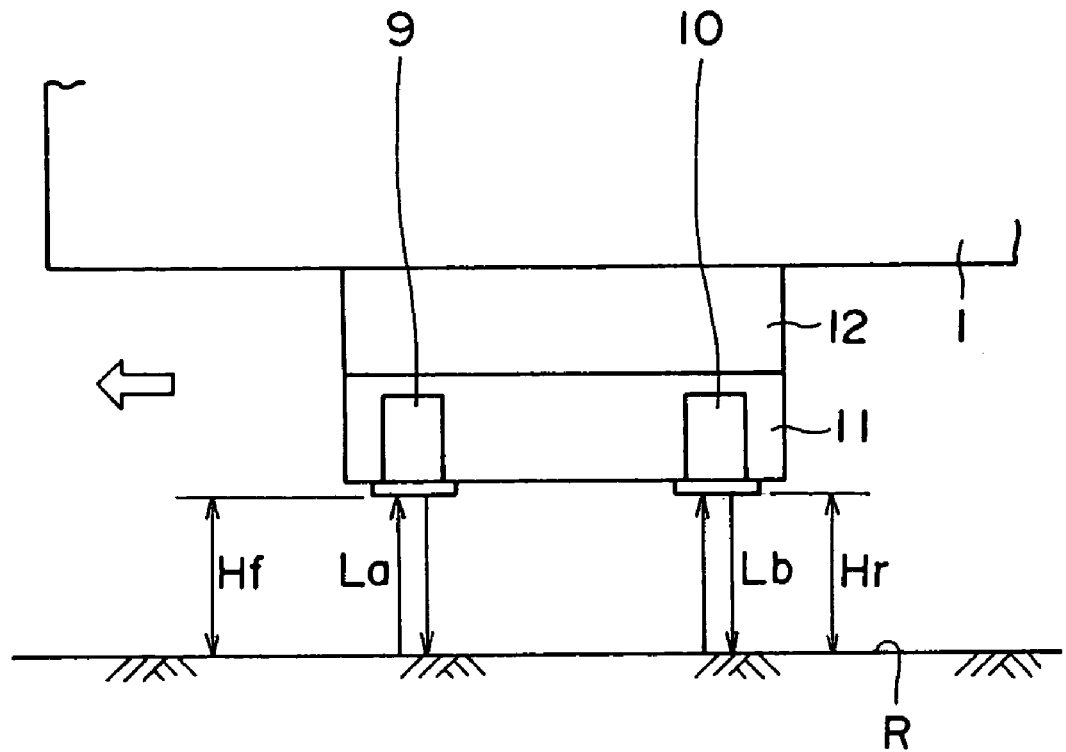
FIGS. 7(a) and 7(b) are explanation drawings of a method for detecting the inclined state of a vehicle.

That is, as shown in FIG. 6 and FIG. 7(a), when the front portion of the vehicle (the front cross member 2) does not incline relative to the road surface R, the front and rear detected heights Hf and Hr are equal. Thus, a path La of an ultrasonic wave, which is transmitted from the front transmitter 9a to the front receiver 9b, is equal to a path Lb of an ultrasonic wave, which is transmitted from the rear transmitter 10a to the rear receiver 10b (i.e. ΔTf=ΔTr). As a result, the receiving time difference ΔT=(ΔTf−ΔTr)/2 between the front and rear receivers 9b and 10b is zero.

Figure 7B:
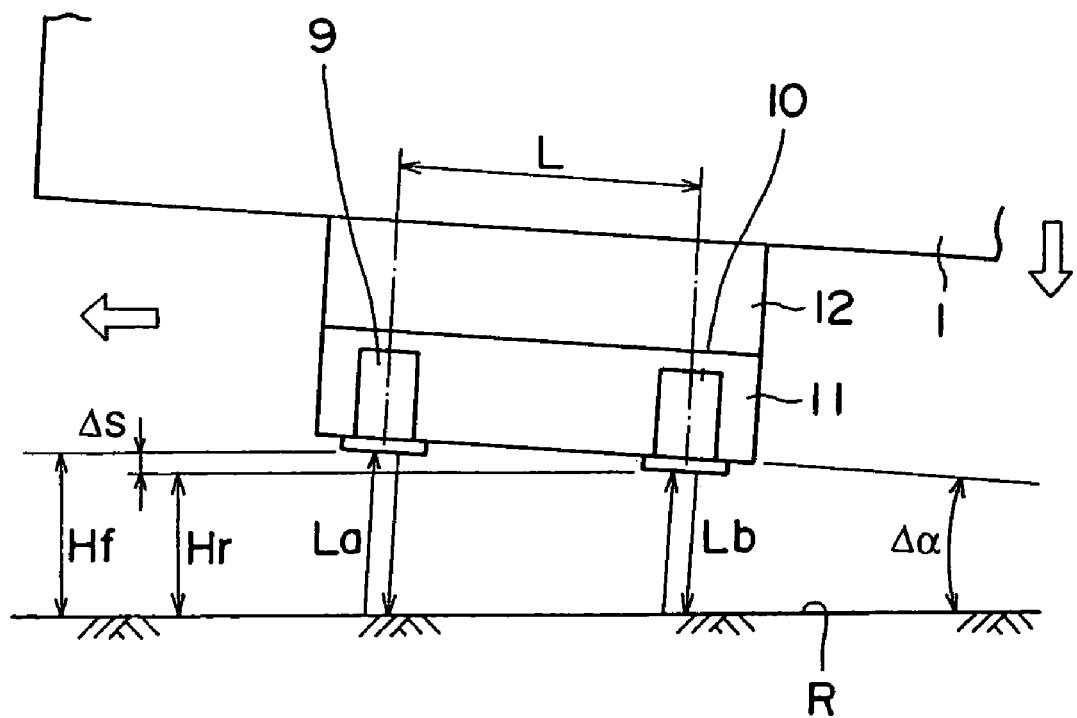

As shown in FIG. 6 and FIG. 7(b), on the other hand, assume that a cargo is loaded on the cargo bed 4, whereby the rear portion of the vehicle sinks, making the front portion of the vehicle inclined rearward (upward) relative to the road surface R. In this case, the front and rear detected heights Hf and Hr are different. Thus, the path La of an ultrasonic wave, which is transmitted from the front transmitter 9a to the front receiver 9b, is longer than the path Lb of an ultrasonic wave, which is transmitted from the rear transmitter 10a to the rear receiver 10b (i.e. ΔTf>ΔTr). As a result, the receiving time difference ΔT occurs between the front and rear receivers 9b and 10b.

When the front portion of the vehicle is inclined rearward, as noted above, a distance difference ΔS occurs in the height direction between the transmitters 9a and 10a separated by a distance L. This distance difference ΔS can be found from the equation (1), indicated below, based on the receiving time difference ΔT, ambient temperature and sound velocity. In this equation, K denotes a coefficient based on ambient temperature and sound velocity. Inclination angle Δα can be calculated from the equation (2), indicated below, based on the distance difference AS and the longitudinal distance L between the receivers 9b and 10b.

$$\Delta S = (Hf - Hr) = \Delta T \times K \quad (1)$$

$$\Delta\alpha = \tan^{-1}(\Delta S/L) \quad (2)$$

Thus, the ECU 7 can determine the inclined state of the vehicle by deriving the distance difference ΔS based on the receiving time difference ΔT between the receivers 9b and 10b, and calculating the inclination angle Δα from the above-mentioned equation (2).

In contrast to what is shown in FIG. 7(b), assume that a cargo is loaded on the cargo bed 4, whereby the front portion of the vehicle sinks, making the front portion of the vehicle inclined forward (downward) relative to the road surface R. In this case, the path Lb is longer than the path La. As a result, the receiving time difference ΔT occurs between the front and rear receivers 9b and 10b. In the same manner as described above, the inclination angle Δα is calculated from the aforementioned equation (2), whereby the inclined state of the vehicle can be determined.

The headlamp 5 and a light axis adjusting apparatus for it will be described with reference to FIGS. 9 and 10.

Figure 9:
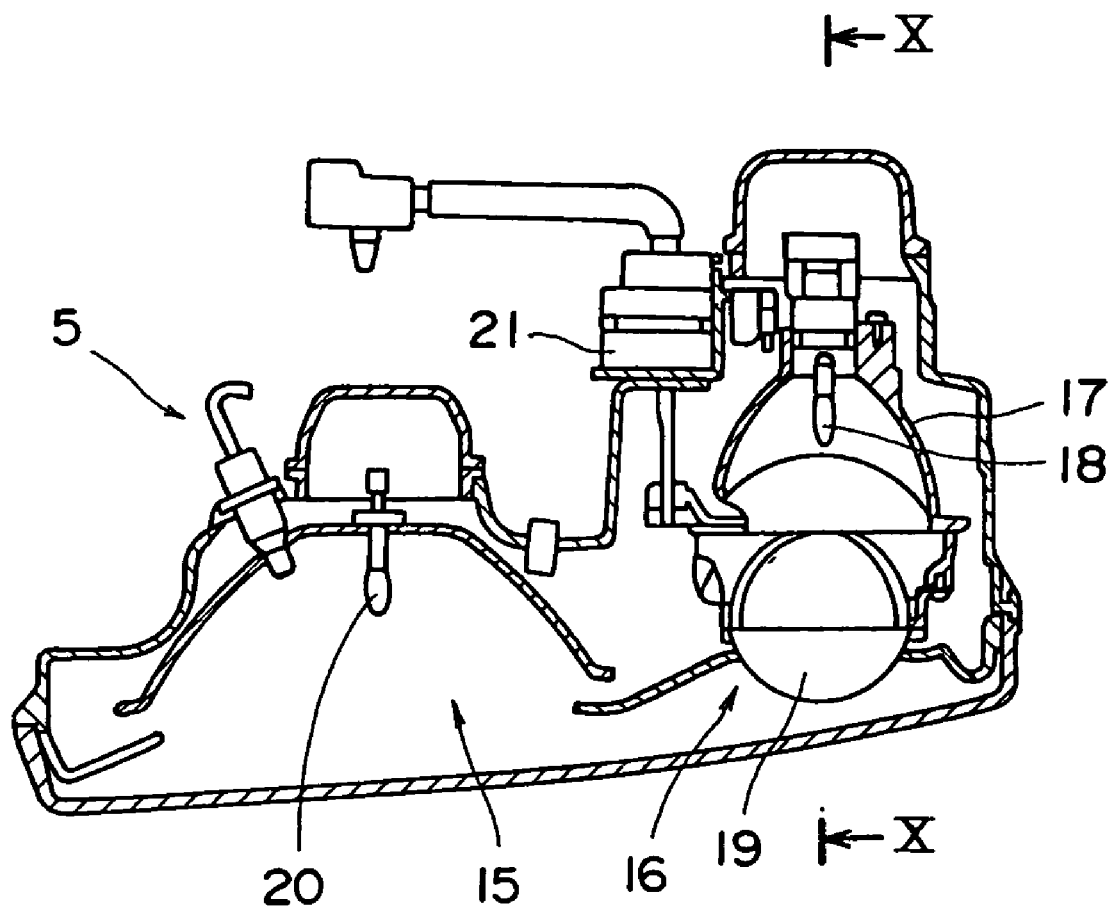
FIG. 9 is a horizontal sectional view of a headlamp portion mounted with the light axis adjusting apparatus for the vehicle headlamp.
Figure 10:
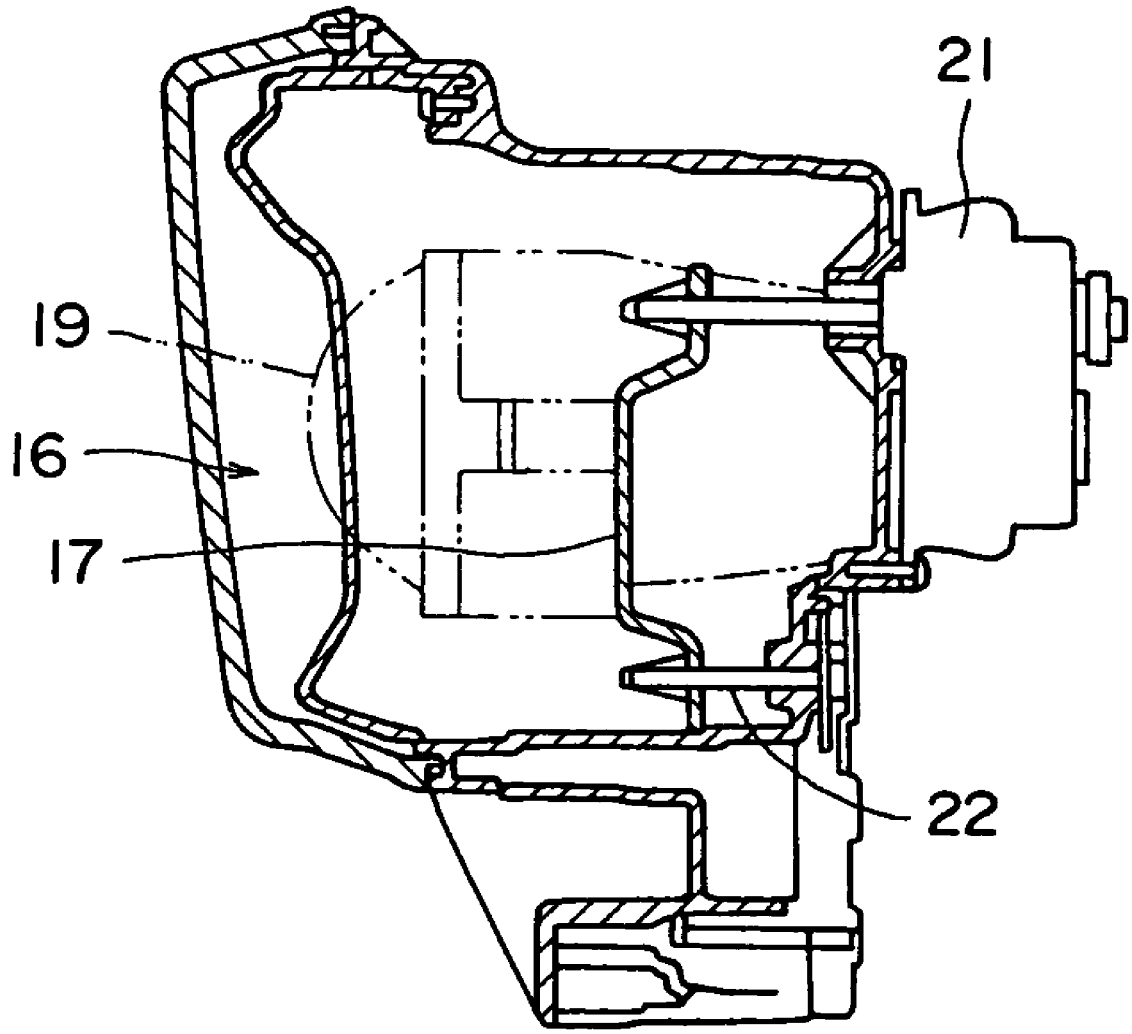
FIG. 10 is a sectional view taken on line X—X of FIG. 9.

As shown in FIGS. 9 and 10, the headlamp 5 is composed of a high-beam lamp 15 and a low-beam lamp 16, and the low-beam lamp 16 is, for example, a high intensity lamp (e.g. a discharge headlamp). The low-beam lamp 16 comprises a high intensity bulb 18 mounted on a reflector holder 17, and has a condenser lens 19. The high-beam lamp 15 has, for example, a halogen bulb 20. The high intensity bulb 18 is tilted, together with the reflector holder 17, by an actuator 21 as a light axis adjusting apparatus, to have its light axis adjusted vertically. The actuator 21 is driven by a command issued by the ECU 7 according to the inclined state determined by the ECU 7 based on the information from the inclination sensor 6. As a result, the light axis of the high intensity bulb 18 is adjusted.

The low-beam lamp 16 is also provided with a manual screw 22 with which to adjust the reflector holder 17 manually, thereby adjusting the light axis of the high intensity bulb 18. The manual screw 22 is used to set the position of the light axis of the high intensity bulb 18 with respect to the initial value of the inclination sensor 6.

It is also possible to adjust the high-beam lamp 15 vertically by the actuator 21 in the same manner as for the low-beam lamp 16. The headlamp is also available as a structure composed of the reflector holder and the bulb integrated together. If the reflector holder and the bulb are integral, the light axis of the bulb can be adjusted by tilting the reflector holder by the actuator.

Figure 11:
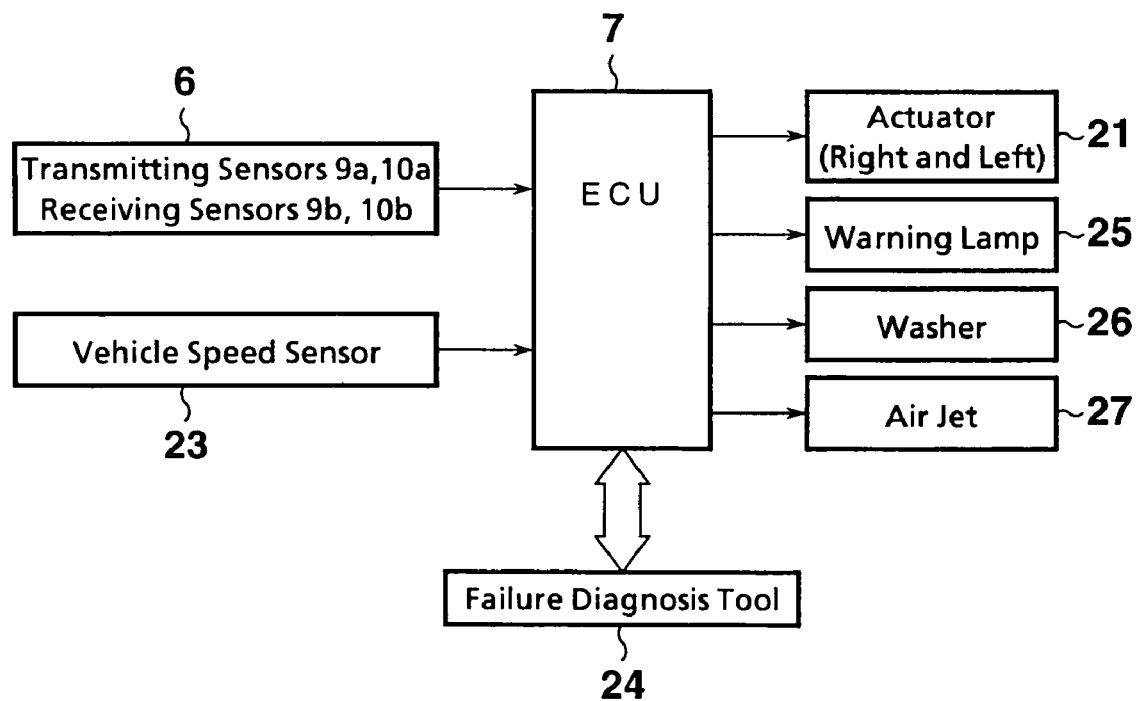
FIG. 11 is a control block chart for the light axis adjusting apparatus for the vehicle headlamp in the present embodiment.

With the light axis adjusting apparatus for the vehicle headlamp according to the present embodiment configured as above, the ECU 7 receives information from a vehicle speed sensor 23, and also receives detection signals from the inclination sensor 6 (transmitters 9a, 10a and receivers 9b, 10b), as shown in FIG. 11. The ECU 7 determines the halt state or driving state of the vehicle based on the vehicle speed detected by the vehicle speed sensor 23, and also computes the aforementioned inclination angle Δα based on the detection results from the transmitters 9a, 10a and the receivers 9b, 10b. A drive command is issued to the actuator (the actuator for the right and left headlamps 5) 21 for tilting the reflector holder 17, whereby the light axis of the high intensity bulb 18 is adjusted into a predetermined state based on the status and the inclined state of the vehicle.

The ECU 7 is also furnished with the function of using the results of the inclination angle Δα, present when the vehicle is empty and on a flat road, as the initial value, and issues a command to store the initial value through a detachable failure diagnosis tool 24. The result of the inclination angle Δα, obtained when the vehicle is empty and on a flat road, is taken up as the initial value and, in this condition, the light axis of the high intensity bulb 18 is adjusted to a predetermined state by the manual screw 22. Based on the initial value stored, the actuator 21 is driven according to the inclination angle Δα computed from the information fed by the inclination sensor 6 to adjust the light axis of the high intensity bulb 18 in accordance with the inclined state.

According to the above feature, even if variations exist in the detection status of the inclination sensor 6, it is possible to determine the inclined state always with constant accuracy and adjust the light axis of the high intensity bulb 18. Furthermore, the command is issued to store the initial value by the failure diagnosis tool 24. Thus, initialization can be performed easily by utilizing the existing device.

Figure 12:
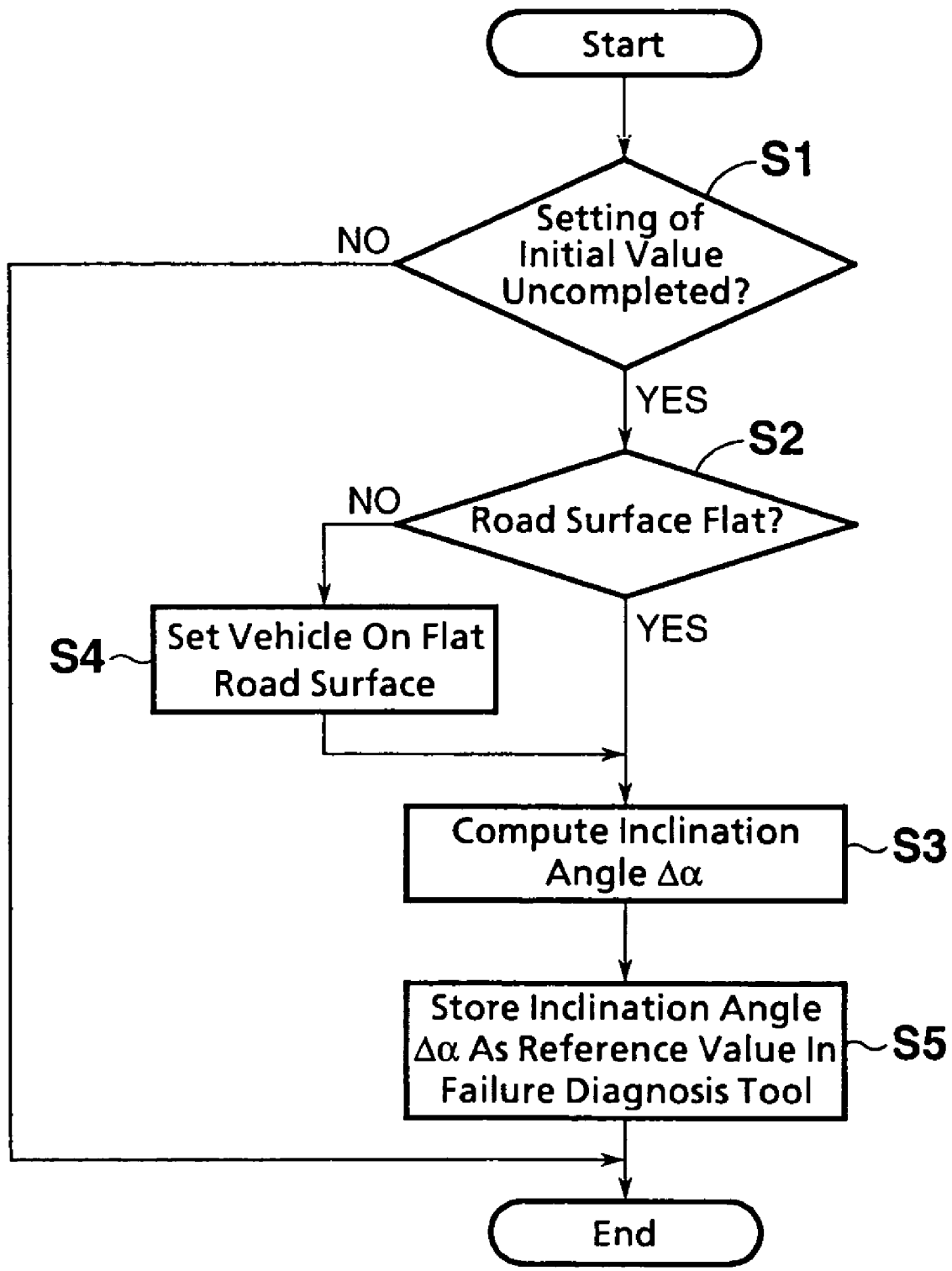
FIG. 12 is a flow chart for initialization by the light axis adjusting apparatus for the vehicle headlamp in the present embodiment.

That is, at the time of shipment of the vehicle from the factory, it is determined in step S1 whether setting of the initial value has been completed or not, as shown in FIG. 12. If a determination is made that setting of the initial value has not been completed, whether the road surface is flat or not is determined in step S2. When it is determined in step S2 that the road surface is flat, the inclination angle $\Delta\alpha$ is computed in step S3 based on detected information from the transmitters 9a, 10a and the receivers 9b, 10b. In step S5, a command is issued to store the inclination angle $\Delta\alpha$, computed at that time, as the initial value in the failure diagnosis tool. As a result, the initial value is stored in the ECU 7. If it is determined in step S2 that the road surface is not flat, the vehicle is set on the flat road surface in step S4, and the program proceeds to step S3. When it is determined in step S1 that setting of the initial value has been completed, the program ends at this stage.

The initial value may be stored not by the failure diagnosis tool 24, but by an initial value switch provided on the vehicle body, or by the insertion and extraction of a harness connector.

After the inclination angle $\Delta\alpha$ computed from the detected information from the transmitters 9a, 10a and the receivers 9b, 10b on the flat road surface is set as the initial value, the high intensity bulb 18 is tilted, together with the reflector holder 17, by the manual screw 22 to adjust the light axis of the high intensity bulb 18 to the state of the light axis on the flat road surface. By so doing, it becomes possible to exercise control according to the detected information from the inclination sensor 6 based on the inclination angle $\Delta\alpha$ computed for the flat road (auto-leveling).

After the time of vehicle shipment from the factory, auto-leveling is started. On this occasion, the inclined state of the vehicle at a standstill and the inclined state of the vehicle during driving (for example, at 40 km/h or more) are detected. The ECU 7 drives the actuator 21 based on the information from the inclination sensor 6 to adjust the light axis of the high intensity bulb 18.

According to the present embodiment, when the road surface is rough, or the vehicle drives over a road block or a protrusion, data on the inclined state may respond to this situation, making accurate detection impossible. Thus, high frequency components (for example, frequency components exceeding 0.1 Hz) of the data on the inclined state are removed by filtering. When many data on the inclined state are collected, and the respective frequency components are examined for deviation, data as high frequency components (for example, data as frequency components exceeding 0.1 Hz) have been confirmed to have sharply increased deviations. Thus, data as high frequency components are removed. This treatment enables the inclined state to be determined by data with relatively small deviations, namely, by data excluding situations where the road surface has irregularities or the vehicle drives over a road block or protrusion.

When the vehicle is in a halt state, the method of updating the data on the inclined state can be selected depending on the condition of the road surface. When the vehicle is stopping, the road situation is grasped based on the standard deviation of detected data. If the road condition is satisfactory, the average value of the data is used as updating data on the inclined state. If the road condition is poor, it is determined whether a cargo has been loaded or unloaded. When there has been loading or unloading, the amount of change in data due to loading or unloading is computed, and this amount of change is added to or subtracted from the existing data on the inclined state to update the data.

That is, while the vehicle is stopping, proper data on the inclined state cannot be obtained, if there is a road seam, a road block or a protrusion on the road surface detected by the inclination sensor 6. Thus, a specified number of data on the inclined state are collected, and a standard deviation is computed. If this standard deviation is not greater than a stop specified value, it is determined that the road situation is satisfactory. Based on this determination, the data on the inclined state is updated with the average value of the data whose standard deviation is not greater than the stop specified value. If the standard deviation is greater than the stop specified value, it is determined that the road condition is poor. Based on this determination, data on the inclined state are collected, and processed by the moving average method. When the average values obtained by this processing converge within a predetermined range, the convergent average values a restored in memory. The difference between the maximum value and the minimum value of the convergent average values is set as an amount of change in the data on the inclined state. When this amount of change is not smaller than a set amount of change which has been preset, this amount of change is added to or subtracted from the current inclination angle data to update the data. During a halt of the vehicle, the collected data are confirmed to vary within a narrow range because of the occupant's ingress or egress or engine vibrations. When the cargo is loaded or unloaded, on the other hand, the collected data are confirmed to vary within a wide range.

The inclination sensor 6 is placed below the cross member 2 and exposed to the outside. Thus, there are cases where a stain such as dust or mud deposits on the signal transmitting portion composed of the transmitters 9a, 10a or the signal receiving portion composed of the receivers 9b, 10b in the ultrasonic sensors 9, 10, thereby making accurate detection of the inclined state impossible. In the present embodiment, therefore, an abnormality of the inclination sensor 6 is detected (abnormality detector) based on the received state of ultrasonic signals received by the inclination sensor 6. Once the abnormality of the inclination sensor 6 has been detected, this information is conveyed to the occupant, and the stain deposited is cleaned off.

In this case, the abnormality of the inclination sensor 6 is determined in 3 stages. That is, if the intensity of ultrasonic signals received by the ultrasonic sensors 9, 10 is within predetermined specified values which have been preset, the abnormality is determined. Moreover, if the deviation between the transmitting-receiving time difference $\Delta Tf$ of the ultrasonic signal of the front ultrasonic sensor 9 and the transmitting-receiving time difference $\Delta Tr$ of the ultrasonic signal of the rear ultrasonic sensor 10 is not smaller than a predetermined specified value which has been preset, the abnormality is determined. Furthermore, if the amount of change (or the rate of change) of the inclined state (inclination angle $\Delta\alpha$) of the vehicle, which is calculated based on the receiving time difference $\Delta T$ between the ultrasonic signals of the ultrasonic sensors 9, 10 is not less than a predetermined specified value which has been preset, the abnormality is determined.

As shown in FIG. 11, an instrument panel within a vehicle compartment is provided with a warning lamp 25 as a display device, and the inclination sensor 6 is equipped with a washer 26 and an air jet 27 as a cleaning device for cleaning the signal transmitting portion composed of the transmitters 9a, 10a and the signal receiving portion composed of the receivers 9b, 10b. Once the ECU determines the abnormality from the received signals of the inclination sensor 6, the ECU 7 lights the warning lamp 25 to inform the occupant, actuates the washer 26 to remove the stain, and actuates the air jet 27 for drying.

The method of detecting an abnormality and the method of updating vehicle inclination angle data by the light axis adjusting apparatus for a vehicle headlamp according to the present embodiment will be described in detail with reference to FIGS. 13 to 18.

Figure 13:
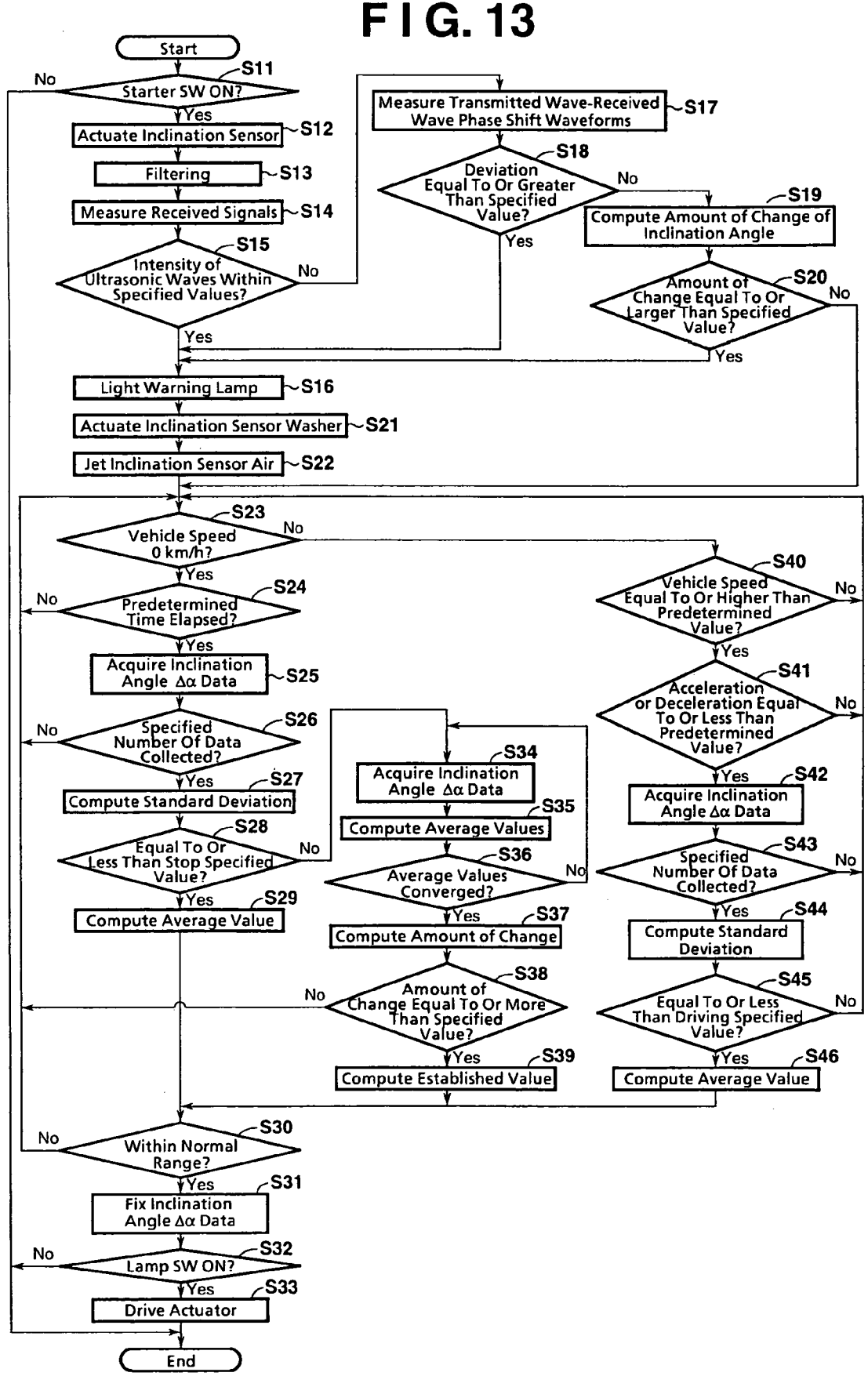
FIG. 13 is a flow chart for adjustment and control by the light axis adjusting apparatus for the vehicle headlamp in the present embodiment.

As shown in FIG. 13, when auto-leveling is started, it is determined in step S11 whether a starter SW is on or not. Upon determination that the starter SW is on, the inclination sensor 6 is actuated in step S12 to compute the inclination angle $\Delta\alpha$. After computation of the inclination angle $\Delta\alpha$ in step S12, filtering is executed in step S13 for removing high frequency components (for example, frequency components exceeding 0.1 Hz) from the data on the inclination angle $\Delta\alpha$. This filtering removes data, which are obtained when the road surface has irregularities or the vehicle drives over a road block or protrusion, from the data on the inclination angle $\Delta\alpha$. Thus, proper data on the inclined state can be obtained.

In step S14, the received signals of the receivers 9b, 10b in the inclination sensor 6 are measured. Then, in step S15, whether the inclination sensor 6 is normal or not is determined based on the intensity of the ultrasonic signals received by the ultrasonic sensors 9, 10. Concretely, as shown in FIG. 14, the ultrasonic sensors 9, 10 transmit ultrasonic waves of a predetermined intensity, namely, predetermined amplitude, and receive ultrasonic waves reflected by the road surface. If the receivers 9b, 10b function normally, the ultrasonic signals received are ultrasonic waves having nearly the same amplitude as that of the ultrasonic waves transmitted. In step S15, therefore, if the amplitude (intensity) of the waveform of the detection signal of the ultrasonic wave received by the inclination sensor 6 is within predetermined specified values which have been preset, an abnormality is determined. In this case, the program goes to step S16 to light the warning lamp 25.

If, in step S15, the amplitude (intensity) of the waveform of the detection signal of the ultrasonic wave received by the inclination sensor 6 is not within the specified values, on the other hand, the program goes to step S17. In step S17, the transmitted-received phase shift waveforms of the ultrasonic waves in the front and rear ultrasonic sensors 9 and 10 are measured. In step S18, whether the inclination sensor 6 is normal or not is determined based on the deviation between these waveforms. Concretely, the waveforms of the transmitting-receiving time difference $\Delta$Tf of the ultrasonic signal of the front ultrasonic sensor 9 and the transmitting-receiving time difference $\Delta$Tr of the ultrasonic signal of the rear ultrasonic sensor 10 are found, as shown in FIG. 15. If the receivers 9b, 10b function normally, it follows that the shift between their waveforms, namely, the deviation between them, is small. Thus, an abnormality is determined in step S18, if the deviation (waveform shift) between the transmitting-receiving time difference $\Delta$Tf of the ultrasonic signal of the front ultrasonic sensor 9 and the transmitting-receiving time difference $\Delta$Tr of the ultrasonic signal of the rear ultrasonic sensor 10 is not smaller than a predetermined specified value which has been preset. In this case, the program goes to step S16 to light the warning lamp 25, in the same manner as already stated.

Figure 16:
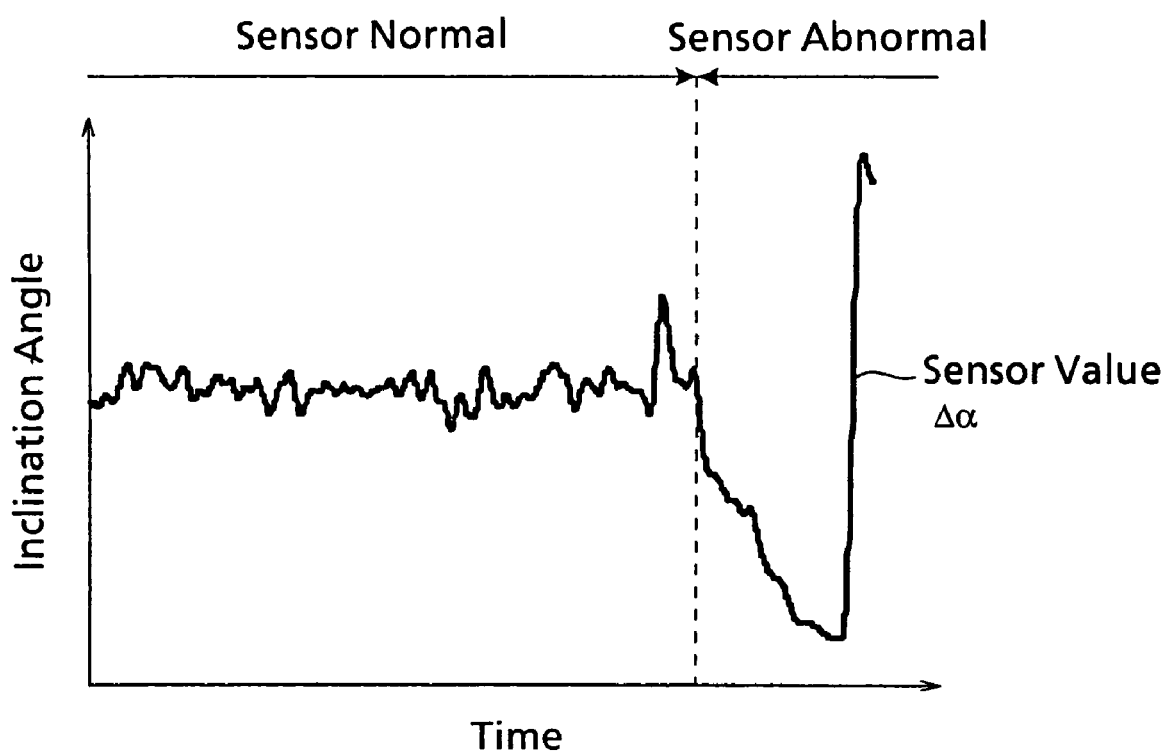
FIG. 16 is a graph showing the amount of change of the receiving time difference between the respective ultrasonic sensors, designed to determine an abnormality of the inclination sensor.

Further, if the deviation between the transmitting-receiving time differences $\Delta$Tf and $\Delta$Tr of the ultrasonic signals of the front and rear ultrasonic sensors 9 and 10 is smaller than the specified value in step S18, the program goes to step S19. In step S19, computation is performed of the amount of change of the inclined state, i.e. inclination angle $\Delta\alpha$, of the vehicle calculated from the receiving time difference $\Delta$T of the inclination sensor 6 (ultrasonic sensors 9, 10). In step S20, it is determined based on the amount of change of the inclination angle $\Delta\alpha$ whether the inclination sensor 6 is normal or not. Concretely, as shown in FIG. 16, if the receivers 9b, 10b function normally, the inclination angle $\Delta\alpha$ of the vehicle changes slightly owing to vehicle body vibrations during driving, or engine vibrations or occupants' ingress and egress during halt, and the amount of change is relatively small. In step S20, therefore, if the amount of change of the inclination angle $\Delta\alpha$ of the vehicle is not less than a predetermined specified value which has been preset, an abnormality is determined. In this case, the program goes to step S16 to light the warning lamp 25, in the same manner as already stated.

If the abnormality of the inclination sensor 6 is determined in any of steps S15, S18 and S20, and when the warning lamp 25 is lit in step S16, the washer 26 is actuated in step S21 to jet a washer solution at the signal transmitting portion composed of the transmitters 9a, 10a and the signal receiving portion composed of the receivers 9b, 10b of the ultrasonic sensors 9, 10, thereby removing the deposited stain such as dust or mud. Then, the air jet 27 is actuated in step S22 to jet air, thereby removing the washer solution adhering to the ultrasonic sensors 9, 10 and drying these sensors. Then, the program goes to step S23. If no abnormality of the inclination sensor 6 is determined in step S20, no cleaning work is done for the inclination sensor 6, and the program goes to step S23.

In step S23, it is determined whether the vehicle speed is 0 km/h or not. Upon determination that the vehicle speed is 0 km/h, it is determined in step S24 whether a predetermined period of time (for example, 5 seconds), during which the vehicle speed remains 0 km/h, has elapsed. Upon determination in step S24 that the predetermined time has elapsed, it is determined that the vehicle is stopping. In this case, data on the inclination angle $\Delta\alpha$ during a vehicle halt is acquired in step S25. If it is determined in step S24 that the predetermined time has not elapsed, a determination is made that the vehicle is making a temporary stop. In this case, the program goes to step S23 to repeat making a determination about the vehicle speed.

After acquisition of data on the inclination angle $\Delta\alpha$ in step S25, it is determined in step S26 whether a specified number of (for example, 100) data on the inclination angle $\Delta\alpha$ have been collected or not. If a determination is made that the specified number of the data have been collected, a standard deviation is computed in step S27 based on the collected data. If it is determined in step S26 that the specified number of data have not been collected, the program goes to step S23.

After computation of the standard deviation in step S27, it is determined in step S28 whether the standard deviation is a stop specified value (dispersion angle: e.g. 0.3 deg) or less. Upon determination that the standard deviation is not more than the stop specified value, the program proceeds to step S29 for the reason that the road condition is satisfactory. In step S29, computation is made of an average value for the data for which it is determined that the standard deviation is not more than the stop specified value. In step S30, it is determined whether the data on the average value is within a normal range or not. If it is determined that the average value data is within the normal range, data on the inclination angle $\Delta\alpha$ is updated (fixed) in step S31.

If it is determined in step S28 that the standard deviation is more than the stop specified value, the road condition is judged to be poor, and the program goes to step S34. After acquisition of data on the inclination angle Δα in step S34, processing by the moving average method is performed in step S35 to compute average values, whenever necessary. In step S36, it is determined whether the computed average values have converged within a predetermined range. If it is determined that the average values have converged within the predetermined range, the converged average values are stored in memory as convergent average values. In step S37, the amount of change between the maximum value and the minimum value of the convergent average values is computed. If a determination is made in step S36 that the average values do not converge within the predetermined range, the program moves to step S34 to repeat its processing. If the convergent average value found in step S36 is only one, the amount of change computed in step S37 is zero.

After computation of the amount of change in step S37, it is determined in step S38 whether the amount of change is equal to or greater than a specified value (set amount of change) which has been preset. If the amount of change is judged to be equal to or greater than the specified value, a determination is made that a cargo has been loaded or unloaded. Thus, the program goes to step S39. Here, the amount of change calculated in step S37 is established as an amount of change for data update. In step S30, a determination of whether the established amount of change is within a normal range or not is made. If a determination is made that data on the amount of change is within the normal range, the amount of change is added to (or subtracted from) the current inclination angle Δα data in step S31 to update (fix) the data on the inclination angle Δα.

In the above procedure, the vehicle is judged to be stopping. Then, a standard deviation is computed from a specified number of collected data. If this standard deviation is a stop specified value or less, the road surface situation is judged to be satisfactory. In this case, the average value of the inclination angle Δα data is used as updating data for the inclination angle Δα. Thus, only the inclination angle Δα data with few variations can be adopted. If the standard deviation computed from the specified number of collected data is greater than the stop specified value, the road condition is poor. In this case, the deviation of the average values converged from average values obtained by moving average processing of the inclination angle Δα data is used as an amount of change. If this amount of change is not less than a specified value, it is determined that cargo loading or unloading has taken place. Based on this determination, this amount of change is taken as an amount of change for data updating. Thus, data on the inclination angle Δα can be updated swiftly, regardless of the road condition.

If the situation of the road surface where the vehicle is stopping is satisfactory, processing can be performed easily in a short time, simply by using the average value of data on the measured inclination angle Δα for updating purposes. If the situation of the road surface is not satisfactory, on the other hand, loading or unloading of a cargo is determined by the amount of change of the average value, and data on the inclination angle Δα can be updated reliably.

If it is determined in step S23 that the vehicle speed is not 0 km/h, the program goes to step S40 to determine whether the vehicle speed is a predetermined value or higher. The predetermined value is set at a value less than a vehicle speed at which there are many variations in data on the inclined state, for example, set at 40 km/h. When a determination is made in step S40 that the vehicle speed is not less than the predetermined value, step S41 determines whether the acceleration or deceleration of the vehicle is a predetermined value or less. The predetermined value at this time is set at a value which is not deemed to represent an accelerated or decelerated state; for example, it is set at 2 m/s$^2$.

Upon determinations in step S40 that the vehicle speed is not less than the predetermined value and in step S41 that the acceleration or deceleration is not more than the predetermined value, data on the inclination angle Δα in the driving state of the vehicle is acquired in step S42. If it is determined in step S40 that the vehicle speed does not exceed the predetermined value, and if it is determined in step S41 that the acceleration or deceleration of the vehicle exceeds the predetermined value, the program proceeds to step S23.

After acquisition of data on the inclination angle Δα in step S42, it is determined in step S43 whether a specified number of (for example, 500) data on the inclination angle Δα have been collected or not. If a determination is made that the specified number of the data have been collected, a standard deviation is computed in step S44 based on the collected data. If it is determined in step S43 that the specified number of data have not been collected, the program goes to step S23.

After computation of the standard deviation in step S44, it is determined in step S45 whether the standard deviation is a driving specified value (dispersion angle: e.g. 0.3 deg) or less. Upon determination that the standard deviation is not more than the driving specified value, the program proceeds to step S46. In step S46, computation is made of an average value for the data for which it is determined that the standard deviation is not more than the driving specified value. In step S30, it is determined that data on this average value is within the normal range or not. If it is determined that the average value data is within the normal range, data on the inclination angle Δα is updated (fixed) in step S31.

In the above procedure, the vehicle is judged to be in a driving state and, only when the vehicle is in the driving state, data on the inclination angle Δα is updated. Thus, data on the vehicle at a low speed or during sudden acceleration or deceleration can be excluded, and data on the inclination angle Δα in a driving situation with few variations can be adopted.

After data on the inclination angle Δα is updated in step S31, with the vehicle is stopping or being driven, the program goes to step S32. If the lamp SW is judged to be on in step S32, the actuator 21 is driven in step S33 to adjust the light axis of the high intensity bulb 18 to the inclination angle Δα.

Figure 17:
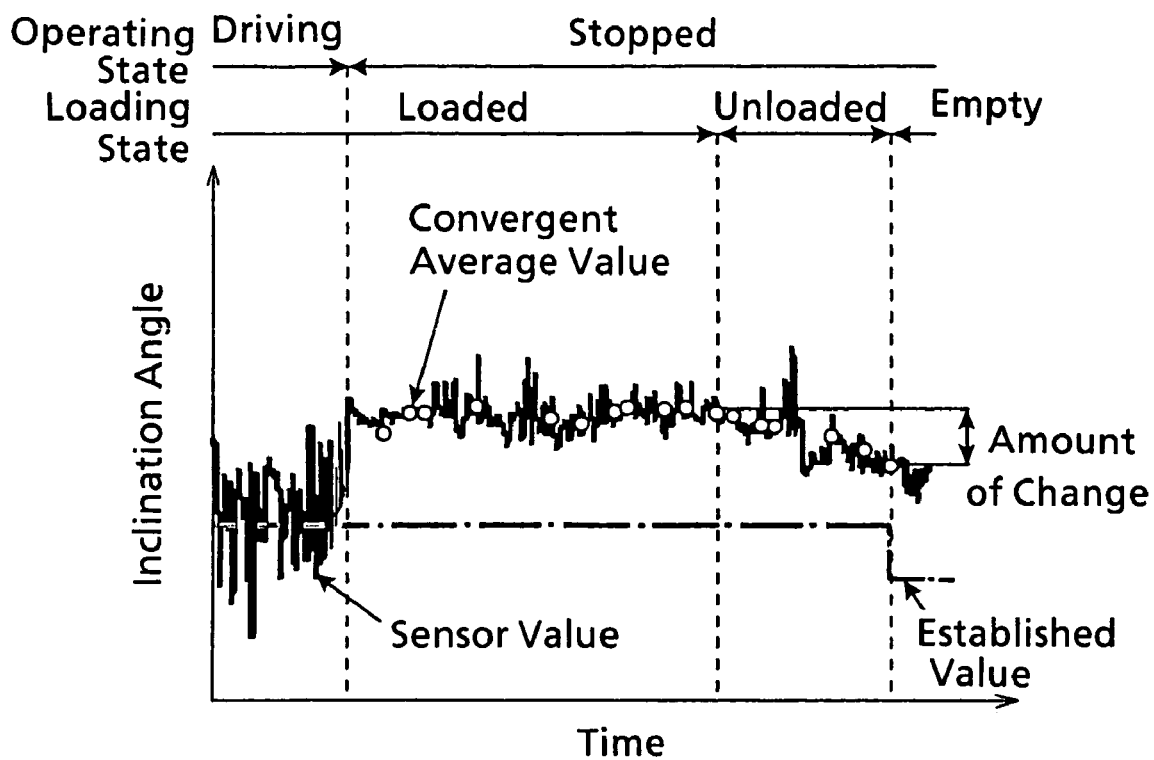
FIG. 17 is a graph showing changes in inclination angle data during driving and halt of the vehicle.
Figure 18:
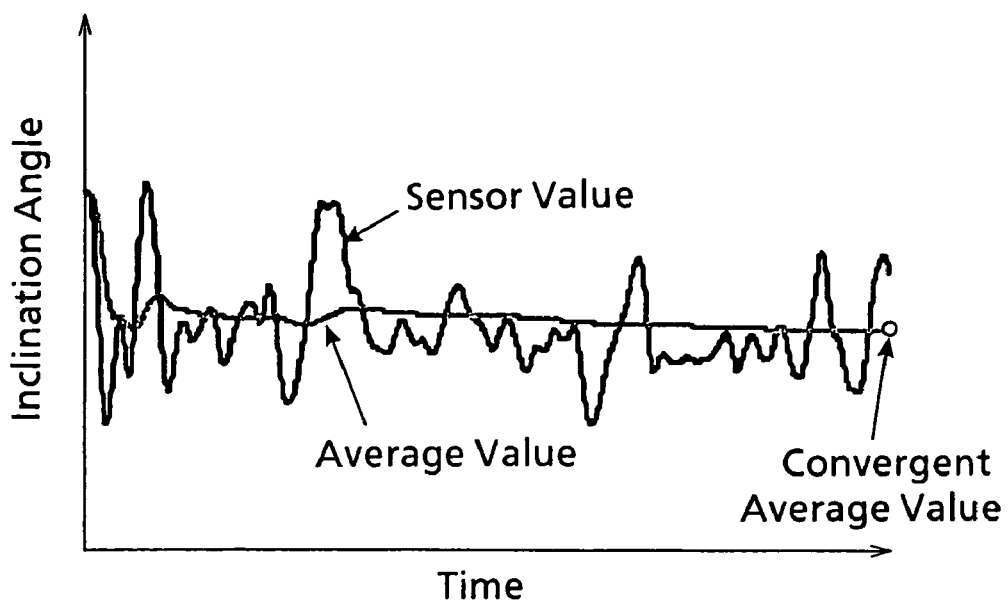
FIG. 18 is a graph showing changes in sensor values and average values of the inclination angle data.

The method of processing data on the inclination angle Δα in the aforementioned vehicle halt state will be described concretely. As shown in FIG. 17, when the vehicle shifts from a driving state to a halt state, the inclination sensor 6 outputs sensor values varying upwardly and downwardly within a predetermined range, regardless of the state of the detected road surface targeted by the inclination sensor 6. The reason is that when the vehicle stops, there are no displacements of the vehicle body according to the state of the road surface; however, the vehicle body is displaced because of ingress and egress of occupants, engine vibrations, etc. On this occasion, the ECU 7 takes in data on the inclination angle Δα, processes the data by the moving average method, and stores those average values, which converge within a predetermined range, as convergent average values. That is, as shown in FIG. 18, the upper and lower peak values of the sensor values outputted by the inclination sensor 6 are sequentially taken in and subjected to moving average processing. If the computed average values converge to a nearly constant level, the average value at this time is taken as a convergent average value, and the convergent average values obtained in this manner are plotted.

This procedure is repeatedly performed to plot a multiplicity of the convergent average values. Based on these convergent average values, the deviation between the maximum value and the minimum value, namely, the amount of change, is computed. If a laden condition (or unloaded condition) continues when the vehicle is at a standstill, the range of upward and downward variations in the sensor values is narrow for the aforementioned reasons. If unloading (or loading) is performed, by contrast, the range of variations in the sensor values is wide, and the convergent average values also vary. Thus, if the amount of change between the maximum value and the minimum value out of the convergent average values is not less than a preset specified value, it is determined that unloading (or loading) has taken place. Using this amount of change as an established value, the current data on the inclination angle $\Delta\alpha$ is updated. Thus, at a time when unloading is carried out to bring the vehicle into an empty condition, the light axis of the high intensity bulb 18 can be adjusted promptly and properly based on the latest data on the inclination angle $\Delta\alpha$.

With the light axis adjusting apparatus for a vehicle headlamp according to the present embodiment, as described above, there is provided the inclination sensor 6 which receives at least two ultrasonic signals transmitted toward the road surface in the vehicle width direction, and detects the inclined state of the vehicle relative to the road surface based on the receiving time difference between the respective ultrasonic signals. Processings are performed such that the inclination angle $\Delta\alpha$ of the vehicle is detected based on the results of detection of the inclination sensor 6; the actuator 21 is driven based on the inclination angle $\Delta\alpha$ to correct the inclination angle of the headlamp 5; and the abnormality of the inclination sensor 6 is detected based on the state of reception of the ultrasonic signal.

Thus, the abnormality of the inclination sensor 6 can be detected early and reliably, and the light axis of the headlamp 5 can be adjusted appropriately and highly accurately with the use of the inclination angle $\Delta\alpha$ detected by the inclination sensor 6.

If the abnormality of the inclination sensor 6 is detected, the warning lamp 25 is lit to inform the occupant. Also, the washer 26 is actuated to remove stain, such as dust or mud, deposited on the transmitting and receiving portions of the ultrasonic sensors 9, 10. Moreover, the air jet 27 is actuated to remove the remaining washer solution and dry these portions.

Thus, stain on the transmitting and receiving portions, which constitutes a major factor for the abnormality of the inclination sensor 6, is removed at an early stage, so that the detection accuracy of the inclination sensor 6 can be increased.

While the present invention has been described in the foregoing fashion, it is to be understood that the invention is not limited thereby, but may be varied in many other ways. For example, according to the above-described embodiment, the abnormality of the inclination sensor 6 is determined in 3 stages, namely, in stages which involve comparisons of the intensity of the ultrasonic signals received, the deviation of the transmitting-receiving time differences of the front and rear ultrasonic signals, and the amount of change (or the rate of change) of the inclined state (inclination angle $\Delta\alpha$) of the vehicle. The occupant is informed of the thus determined abnormality of the inclination sensor 6, and stain is cleaned off. However, the abnormality of the inclination sensor 6 may be determined once or four or more times. The display device used after determination of the abnormality in the inclination sensor 6 is not limited to the warning lamp 25, but may be an alarm raised by a buzzer. Nor is the cleaning device limited to the washer 26 and the air jet 27, but a wiper may be provided. Such variations are not to be regarded as a departure from the spirit and scope of the invention, and all such modifications as would be obvious to one skilled in the art are intended to be included within the scope of the appended claims.

What is claimed is:

1. A light axis adjusting apparatus for a vehicle headlamp, comprising:
    a light axis adjustor for adjusting a light axis of the headlamp of a vehicle;
    an operating state detector for detecting an operating state of the vehicle;
    an inclined state detector including two ultrasonic wave transmitters and two receivers for receiving ultrasonic signals from said transmitters, said inclined state detector being adapted to detect an inclined state of the vehicle relative to a road surface based on a receiving time difference between the respective receivers;
    an abnormality detector for detecting an abnormality of said inclined state detector based on a received state of said ultrasonic signals;
    a display device, placed within a vehicle compartment of the vehicle, for indicating the abnormality of said inclined state detector; and
    a control device for controlling said light axis adjustor based on the results of detection of said inclined state detector and said abnormality detector, and also for actuating said display device when said abnormality detector determines the abnormality of said inclined state detector.

2. The light axis adjusting apparatus for a vehicle headlamp according to claim 1, wherein said abnormality detector determines the abnormality of said inclined state detector when intensity of said ultrasonic signal received is not higher than a predetermined specified value which has been preset.

3. The light axis adjusting apparatus for a vehicle headlamp according to claim 1, wherein said abnormality detector determines the abnormality of said inclined state detector when a deviation between a transmitting-receiving time difference of the ultrasonic signal in one combination of said transmitter and said receiver and a transmitting-receiving time difference of the ultrasonic signal in the other combination of said transmitter and said receiver is not smaller than a predetermined specified value which has been preset.

4. The light axis adjusting apparatus for a vehicle headlamp according to claim 1, wherein said abnormality detector determines the abnormality of said inclined state detector when an amount of change or a rate of change of the inclined state of the vehicle is not smaller than a predetermined specified value which has been preset.

5. The light axis adjusting apparatus for a vehicle headlamp according to claim 1, wherein:
    said vehicle is a truck furnished with a cab and a frame where said cab is disposed, and
    said inclined state detector is placed on said cab or a vehicle front portion of said frame.

6. A light axis adjusting apparatus for a vehicle headlamp, comprising:
    a light axis adjustor for adjusting a light axis of the headlamp of a vehicle;
    an operating state detector for detecting an operating state of the vehicle;

an inclined state detector including at least one ultrasonic wave transmitter and at least two receivers for receiving an ultrasonic signal from said transmitter, said inclined state detector being adapted to detect an inclined state of the vehicle relative to a road surface based on a receiving time difference between the respective receivers;

an abnormality detector for detecting an abnormality of said inclined state detector based on a received state of said ultrasonic signal; and a control device for controlling said light axis adjuster based on results of detection of said inclined state detector and said abnormality detector, wherein a display device for indicating the abnormality of said inclined state detector is provided within a vehicle compartment of the vehicle, and wherein said control device actuates said display device when said abnormality detector determines the abnormality of said inclined state detector.

7. A light axis adjusting apparatus for a vehicle headlamp, comprising:

a light axis adjuster for adjusting a light axis of the headlamp of a vehicle;

an operating state detector for detecting an operating state of the vehicle;

an inclined state detector including at least one ultrasonic wave transmitter and at least two receivers for receiving an ultrasonic signal from said transmitter, said inclined state detector being adapted to detect an inclined state of the vehicle relative to a road surface based on a receiving time difference between the respective receivers;

an abnormality detector for detecting an abnormality of said inclined state detector based on a received state of said ultrasonic signal; and a control device for controlling said light axis adjuster based on results of detection of said inclined state detector and said abnormality detector, wherein a cleaning device is provided for cleaning a signal receiving portion of said inclined state detector, and wherein said control device actuates said cleaning device when said abnormality detector determines the abnormality of said inclined state detector.

8. A light axis adjusting apparatus for a vehicle headlamp, comprising:

light axis adjusting means for adjusting a light axis of the headlamp of a vehicle;

operating state detecting means for detecting an operating state of the vehicle;

inclined state detecting means including two ultrasonic wave transmitters and two receivers for receiving ultrasonic signals from said transmitters, said inclined state detecting means being adapted to detect an inclined state of the vehicle relative to a road surface based on a receiving time difference between the respective receivers;

abnormality detecting means for detecting an abnormality of said inclined state detecting means based on a received state of said ultrasonic signals;

display means, placed within a vehicle compartment of the vehicle, for indicating the abnormality of said inclined state detecting means; and control means for controlling said light axis adjusting means based on the results of detection of said inclined state detecting means and said abnormality detecting means, and also for actuating said display means when said abnormality detecting means determines the abnormality of said inclined state detecting means.

* * * * *